United States Patent
Takase et al.

(10) Patent No.: US 7,660,844 B2
(45) Date of Patent: Feb. 9, 2010

(54) NETWORK SERVICE SYSTEM AND PROGRAM USING DATA PROCESSING

(75) Inventors: Toshiro Takase, Yanato (JP); Yuichi Nakamura, Yokohama (JP); Ryo Neyama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 10/382,610

(22) Filed: Mar. 5, 2003

(65) Prior Publication Data

US 2003/0236857 A1 Dec. 25, 2003

(30) Foreign Application Priority Data

Mar. 7, 2002 (JP) ............................. 2002-061651

(51) Int. Cl.
G06F 15/16 (2006.01)
(52) U.S. Cl. ...................... 709/203; 709/217; 709/223
(58) Field of Classification Search ................ 709/217, 709/227, 250, 203; 711/113, 118, 100
See application file for complete search history.

(56) References Cited

U.S. PATENT DOCUMENTS

2001/0042171 A1* 11/2001 Vermeulen .................. 709/219
2002/0129024 A1* 9/2002 Lee ............................ 707/10
2002/0184340 A1* 12/2002 Srivastava et al. ........... 709/219

FOREIGN PATENT DOCUMENTS

| JP | 06-086380 A | 3/1994 |
| JP | 08-095592 A | 4/1996 |
| JP | 08-329040 A | 12/1996 |
| JP | 10-207490 A | 8/1998 |

* cited by examiner

Primary Examiner—William C Vaughn, Jr.
Assistant Examiner—Scott Christensen
(74) Attorney, Agent, or Firm—Cantor Colburn LLP; Ken Corsello

(57) ABSTRACT

Provides efficient cache systems in a network service that allows for different expressions of requests with the same meaning, such as in a web work service using XML. The invention can be implemented as a network service system comprising a server and a client connected via a network. In this system, the client transmits a processing request that includes a certain canonicalized XML document to the server, and the server returns a response to the processing request while the server processes the XML document included in the processing request and caches the content of the response by using the processed XML document as a key.

19 Claims, 11 Drawing Sheets

(A) XML DOCUMENT

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/">
    <SOAP-ENV:Body>
        <GetLastTradePrice xmlns="urn:stock-quote">
            <symbol>IBM</symbol>
        </GetLastTradePrice>
    </SOAP-ENV:Body>
</SOAP-ENV:Envelope>
```

(B) CANONICALIZED XML DOCUMENT

```
<ns1:Envelope xmlns:ns1="http://schemas.xmlsoap.org/soap/envelope/"
 ns1:encodingStyle="http://schemas.xmlsoap.org/soap/encoding/">
<ns1:Body>
<ns2:GetLastTradePrice xmlns:ns2="urn:stock-quote">
<ns2:symbol>IBM</ns2:symbol>
</ns2:GetLastTradePrice>
</ns1:Body>
</ns1:Envelope>
```

(C) TEMPLATE

```
<ns1:Envelope xmlns:ns1="http://schemas.xmlsoap.org/soap/envelope/"
 ns1:encodingStyle="http://schemas.xmlsoap.org/soap/encoding/">
<ns1:Body>
<ns2:GetLastTradePrice xmlns:ns2="urn:stock-quote">
<ns2:symbol>$symbol$</ns2:symbol>
</ns2:GetLastTradePrice>
</ns1:Body>
</ns1:Envelope>
```

Fig. 5

URL=http://something.com/service_a/

| Request-Hash | Response-Hash | Response-Content |
|---|---|---|
| pCWzQ3juvbUHK.... | 8TqjFJPnaUZKRw.... | <?xml version="1.0"?><ns1:Envelope xmlns:ns1="http://schemas.xml......>.........</ns1:Envelope> |
| 9PgwNGgkTDs...... | WaX21pBkj1Zd0.... | |
| | | |
| | | |

URL=http://something.com/service_b/

| Request-Hash | Response-Hash | Response-Content |
|---|---|---|
| +xm3p5Xqx1/Qy | bsEiVQ5HJrAHl.... | <?xml version="1.0"?><ns1:Envelope xmlns:ns1="http://schemas.xml......>.........</ns1:Envelope> |
| 9PgwNGgkTDs...... | WaX21pBkj1Zd0.... | |
| | | |
| | | |

Fig. 10

```
POST /StockQuote HTTP/1.1
Host: www.stockquote.com
Content-Type: text/xml; charset="utf-8"
SOAPAction: ""
Request-Hash: pCWzQ3juvbUHK...
Response-Hash: 8TqjFJpnaUZKRw...
Is-Canonicalized: true <ns1:Envelope xmlns:ns1="http://schemas.xmlsoap.org/soap/envelope/"
 ns1:encodingStyle="http://schemas.xmlsoap.org/soap/encoding/">
<ns1:Body>
<ns2:GetLastTradePrice xmlns:ns2="urn:stock-quote">
<ns2:symbol>IBM</ns2:symbol>
</ns2:GetLastTradePrice>
</ns1:Body>
</ns1:Envelope>
```

Fig. 11

```
HTTP/1.1 204 No Content
Request-Hash: pCWzQ3juvbUHK...
Response-Hash: 8TqjFJpnaUZKRw...
```

NETWORK SERVICE SYSTEM AND PROGRAM USING DATA PROCESSING

FIELD OF THE INVENTION

This invention relates to efficient determination of which memory area a certain address belongs to in data processing with a computer.

BACKGROUND ART

When web pages (HTML documents) on the Internet are displayed with a web browser, recently obtained web pages are cached in order to improve response times for requests for these web pages.

An HTTP GET request, which is used to obtain and display a web page on a web browser, has its unique returned HTML document (response) specified by a URL (Uniform Resource Locator). Therefore, the URL can be used as a key to store (cache) the HTML document on the web browser (client machine) or a proxy (server machine), and the stored HTML document can be returned for a request that specifies the same URL without need of accessing a server application. Thus, the response time can be reduced.

If the HTML document is to be cached on the web browser, the web page that has been previously accessed is stored on a local disk of the client machine. Then, if the same URL (web page) is to be accessed, a request is transmitted with a timestamp of the stored web page added to the If-Modified-Since header of HTTP. If the server supports caching by the web browser (client), the server checks if the requested web page has been updated since the time of the timestamp added to the received request. If it has not been updated, a response with an empty body and a status code 304 (Not Modified) is returned. The web browser then displays the web page stored on the local disk. On the other hand, if the web page has been updated since the time of the timestamp, the server returns a usual response, i.e., the HTML document of the requested web page.

If the HTML document is to be cached in the proxy, the URL is used as a key to store the HTML document in memory of the server machine. For a request that specifies the same URL, the proxy reads the stored HTML document from the memory and returns the HTML document without accessing the server application. In this case, the cache is supposed to keep its content up-to-date.

Today, network services that use XML documents as inputs and outputs, such as web services, are becoming popular. However, in providing such a service, a response may not be uniquely specified by a URL (or a URI (Uniform Resource Identifier)). This is because in web services, the content of an XML document (service) to be returned often depends on the content of an XML document included in a request.

Thus, in such a system that uses XML documents as inputs and outputs, using URLs as keys to cache XML documents is difficult.

A possible way is to use a literal expression of an XML document included in a request as a key to cache a response XML document. However, there may be many XML documents with different expressions of strings and therefore different literal expressions for a key, even though the XML documents are the same in their meaning for the server application. Therefore, an efficient cache hit cannot be provided.

SUMMARY OF THE INVENTION

An aspect of this invention is to provide an efficient cache system in a network service that allows for different expressions of requests with the same meaning, such as a web work service using XML. In an example embodiment, the invention is implemented as a data processing method for responding to a certain processing request with cached data, the method comprising the steps of: caching data used for responding to a first processing request in memory by using a data file included in the first processing request as a key; and, for a second processing request made after caching the data, searching for the data cached in the memory by using a data file included in the second processing request as a key, and if the cached data corresponds to the second processing request, responding to the second processing request with the cached data.

In an alternate embodiment, the invention is implemented as a network service system comprising a server and a client connected via a network. In this system, the client transmits a processing request that includes a certain XML document to the server, and the server returns a response to the processing request while the server processes the XML document included in the processing request and caches the content of the response by using the processed XML document as a key.

In still a further embodiment the above aspect is implemented as a server that provides services via a network. The server comprises: an application for generating a response to a request received from a client; a cache table for storing the response to the request by using a data file included in the request as a key; and a response processing unit for searching the cache table by using the data file as a key, wherein if a cached response (response file) corresponding to the request is found, the response processing unit returns the cached response to the client, and if a cached response (response file) corresponding to the request is not found, the response processing unit passes processing to the application and stores a response generated by the application in the cache table.

Preferably, the server may further comprise a canonicalization unit for canonicalizing the data file included in the request according to a predetermined canonicalization rule. In this case, the cache table stores the response (response file) by using the data file canonicalized by the canonicalization unit as a key, and the response processing unit searches the cache table by using the data file canonicalized by the canonicalization unit as a key.

The invention for achieving the above aspect is also implemented as a client that receives services provided from a server via a network. The client comprises: a processing unit for preparing a request that includes an XML document canonicalized according to a predetermined canonicalization rule; a hash value computing unit for computing a hash value of the XML document included in the request prepared by the processing unit and adding the hash value to a header of the request; and a transmission unit for transmitting the request to the server with the hash value of the XML document added to the header.

The invention may also be implemented as a client comprising: a processing unit for preparing a request that includes an XML document canonicalized according to a predetermined canonicalization rule and processing a response to the request from the server; a communication unit for transmitting the request prepared by the processing unit to the server and receiving the request from the server; and a cache table for storing the response from the server by using the XML document included in the request as a key. The processing unit uses the XML document as a key to search the cache table, and if a cached response (response file) corresponding to the request is found, the processing unit uses the cached response (response file) for processing.

The invention may also be implemented as a program for controlling a computer to cause the computer to operate as the above described server or the client. The program may be stored on and distributed as a magnetic disk, an optical disk, semiconductor memory, or other recording media, or may be distributed via a network.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 2 shows an example of a canonicalization rule for XML documents according to the embodiment;

FIG. 3 shows a specific example of an XML document and examples of a canonicalized version of the XML document and a template used in the embodiment;

FIG. 5 shows an exemplary configuration of the cache table used in the embodiment;

FIG. 10 shows an exemplary request transmitted from the client according to the embodiment;

FIG. 11 shows an exemplary response to the request of FIG. 10; and

DESCRIPTION OF SYMBOLS

Figure 1:
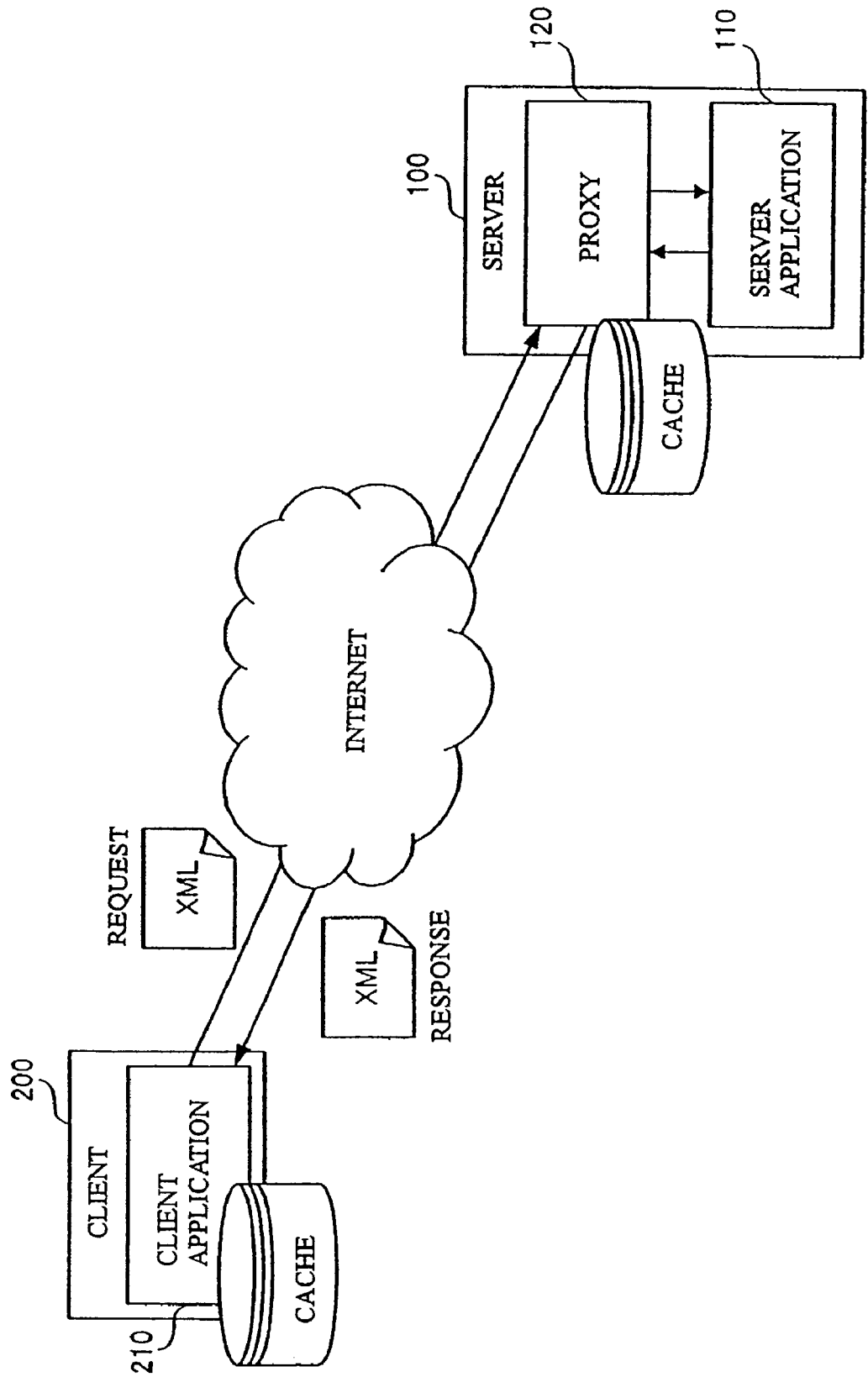
FIG. 1 shows an overall configuration of a web service system according to an embodiment.

100 . . . Server
110 . . . Server application
120 . . . Proxy
121 . . . Canonicalization unit
122 . . . Hash value computing unit
123 . . . Response processing unit
124 . . . Cache table
125 . . . Communication unit
200 . . . Client
210 . . . Client application
211 . . . Processing unit
212 . . . Canonicalization information adding unit
213 . . . Hash value computing unit
214 . . . Communication unit
220 . . . cache table

DESCRIPTION OF THE INVENTION

This invention provides efficient cache systems in a network service that allows for different expressions of requests with the same meaning, such as a web work service using XML. In an example embodiment the invention is implemented as a data processing method for responding to a certain processing request with cached data, the method comprising the steps of: caching data used for responding to a first processing request in memory by using a data file included in the first processing request as a key; and, for a second processing request made after caching the data, searching for the data cached in the memory by using a data file included in the second processing request as a key, and if the cached data corresponds to the second processing request, responding to the second processing request with the cached data.

Specifically, the step of caching data comprises the steps of: canonicalizing the data file included in the first processing request; and caching the data used for responding by using the canonicalized data file as a key. The step of responding to the second processing request comprises the steps of: canonicalizing the data file included in the second processing request; and searching for the cached data by using the canonicalized data file as a key.

It is possible to prepare the first and second processing requests so that they include data files complying with a predetermined canonicalization rule in advance, rather than to extract the data files included in the processing requests for canonicalization. Here, the data files may be XML documents.

Further, the step of caching data preferably comprises the steps of: checking if a hash value of the data file included in the first processing request has been added to the first processing request and computing the hash value if the hash value has not been added; and caching the data used for responding by using the hash value of the data file obtained from the first processing request or obtained by computation as a key. The step of responding to the second processing request comprises the steps of: checking if a hash value of the data file included in the second processing request has added to the second processing request and computing the hash value if the hash value has not been added; and searching for the cached data by using the hash value of the data file obtained from the second processing request or obtained by computation as a key. In this way, by using the hash values that are the compressed forms of the data files, rather than using the data files directly, the cache size in the memory can be reduced.

The invention may also be implemented as a network service system comprising a server and a client connected via a network. In this system, the client transmits a processing request that includes a certain XML document to the server, and the server returns a response to the processing request while the server processes the XML document included in the processing request and caches the content of the response by using the processed XML document as a key.

In this system, in processing of the XML document, the server preferably canonicalizes the XML document according to a predetermined canonicalization rule. Further, the server computes a hash value of the XML document and uses the hash value as a key to cache the content of the response.

Alternatively, the client prepares the processing request that includes the XML document with a template complying with a certain canonicalization rule and transmits the processing request to the server.

The client may also cache the response to the processing request received from the server in memory by using an XML document included in the processing request as a key. In this case, when making a processing request with the same content as the previous processing request, the client searches the memory by using the XML document of the processing request as a key, and uses the cached response for processing.

The invention is also implemented as a server that provides services via a network, the server comprising: an application for generating a response to a request received from a client; a cache table for storing the response to the request by using a data file included in the request as a key; and a response processing unit for searching the cache table by using the data file as a key, wherein if a cached response (response file) corresponding to the request is found, the response processing unit returns the cached response to the client, and if a cached response (response file) corresponding to the request is not found, the response processing unit passes processing to the application and stores a response generated by the application in the cache table.

Preferably, the server may further comprise a canonicalization unit for canonicalizing the data file included in the request according to a predetermined canonicalization rule. In this case, the cache table stores the response (response file) by using the data file canonicalized by the canonicalization unit as a key, and the response processing unit searches the cache table by using the data file canonicalized by the canonicalization unit as a key.

The server may further comprise a hash value computing unit for computing a hash value of the data file included in the request. In this case, the cache table stores the response (response file) by using the hash value of the data file computed by the hash value computing unit as a key, and the response processing unit searches the cache table by using the hash value of the data file computed by the hash value computing unit as a key.

The invention is also be implemented as a client that receives services provided from a server via a network, the client comprising: a processing unit for preparing a request that includes an XML document canonicalized according to a predetermined canonicalization rule; a hash value computing unit for computing a hash value of the XML document included in the request prepared by the processing unit and adding the hash value to a header of the request; and a transmission unit for transmitting the request to the server with the hash value of the XML document added to the header.

The processing unit preferably uses a template complying with the canonicalization rule to prepare the request that includes the XML document.

The invention may also be implemented as a client comprising: a processing unit for preparing a request that includes an XML document canonicalized according to a predetermined canonicalization rule and processing a response to the request from the server; a communication unit for transmitting the request prepared by the processing unit to the server and receiving the request from the server; and a cache table for storing the response from the server by using the XML document included in the request as a key. The processing unit uses the XML document as a key to search the cache table, and if a cached response (response file) corresponding to the request is found, the processing unit uses the cached response (response file) for processing.

The invention may also be implemented as a program for controlling a computer to cause the computer to operate as the above described server or the client. The program may be stored on and distributed as a magnetic disk, an optical disk, semiconductor memory, or other recording media, or may be distributed via a network.

Now, the invention will be described in detail based on an embodiment illustrated in the appended drawings as an efficient cache system by integrating literal expressions of requests with the same meaning in a network service. Although the invention can be generally applied to network services that allow for different expressions of requests with the same meaning, the embodiment will be described by way of example as being applied to a web service that uses XML documents as inputs and outputs.

FIG. 1 shows an overall configuration of a web service system according to the embodiment. Referring to FIG. 1, the web service system of this embodiment includes a server 100 that provides services and a client 200 that uses the services. The server 100 and the client 200 are connected via a web-based network such as the Internet. The server machine that constitutes the server 100 is implemented as a computer having network functionality, such as a workstation or a personal computer, and includes a server application 110 for performing processing relating to the provided services and a proxy 120 for implementing a cache system. The client 200 is implemented as a computer having network functionality, such as a workstation or a personal computer, and includes a client application 210 for receiving the provided services.

In this embodiment, a canonicalized template is used as means for integrating literal expressions of XML documents with the same meaning. For request XML documents that are acceptable for the provided services, the server 100 provides a template in which changeable portions are replaced with variables (the template itself is also an XML document). The client 200 prepares a request XML document by filling in the variable portions of the template. In this way, preparing request XML documents according to the template allows the XML documents with the same meaning to have the same expression. Thus, the cache hit rate with such XML documents as keys can be improved.

In this embodiment, XML-c14n defined by W3C is basically used for XML document canonicalization for the template, while unique rules may be set depending on the content of services (XML documents) provided by the server application 110. For example, canonicalization rules that can be provided for XML documents include a rule for deleting a blank regardless of the element name if it is any one of the portions between (1) a start tag and a start tag, (2) an end tag and a start tag, and (3) an end tag and an end tag, and if the portion is entirely blank (including a return, a tab, etc.); and a rule for integrating name space prefixes.

FIG. 2 shows the canonicalization rule for deleting a blank. Among blanks in an XML document of FIG. 2(A), blanks that apply to the above mentioned portions (1), (2), and (3) are shown at the corresponding places in FIG. 2 (B). These canonicalization rules for deleting a blank and integrating name space prefixes can be generally used for different applications.

FIG. 3 shows a specific example of an XML document, and examples of a canonicalized version of the XML document and a template. The canonicalized XML document shown in FIG. 3 (B) includes returns as appropriate for legibility, but in practice, the return codes will also be deleted by canonicalization. Name space prefixes are designated as ns1, ns2 . . . in the order of appearance. An attribute of a name space declaration (xmlns:ns*=" . . . ") is added to the element that appears first.

In the template shown in FIG. 3(C), variables are enclosed in symbols "$" (shown as a bold string). If the original XML document contains the symbol "$", it is replaced with symbols "$$". Names of the variables should not contain the symbol "$". Strings that can be assigned to the variables should be character data specified in XML 1.0 (character data ::=[^<&]*−([^<&]*))>'[^<&]*))

This embodiment provides efficient caching by using the above described template to prepare a request XML document in a fixed format and by using this XML document as a key. Here, even if a request XML document transmitted from the client 200 has not been canonicalized, the server 100 that receives the request can canonicalize it and take advantage of the caching of this embodiment.

Further, in this cache system, a hash value may be used as a key instead of an XML document itself in order to reduce the cache size in memory of the server 100 or a client 200 in which cache data is stored.

In this case, if the client 200 transmits a request with a hash value of an XML document, the processing cost required for computing the hash value at the server 100 can be saved.

Further, the client 200 may cache a received response XML document, and when making the same request, the client 200 may transmit a hash value of the response XML document with the request. If the response to be returned from the server 100 is the same as the first response, what is required is only that the server 100 return information indicating that the response is the same and the client 200 use the cached XML document according to the information. This can reduce the cost for returning the response and reduce the traffic on the network.

Figure 4:
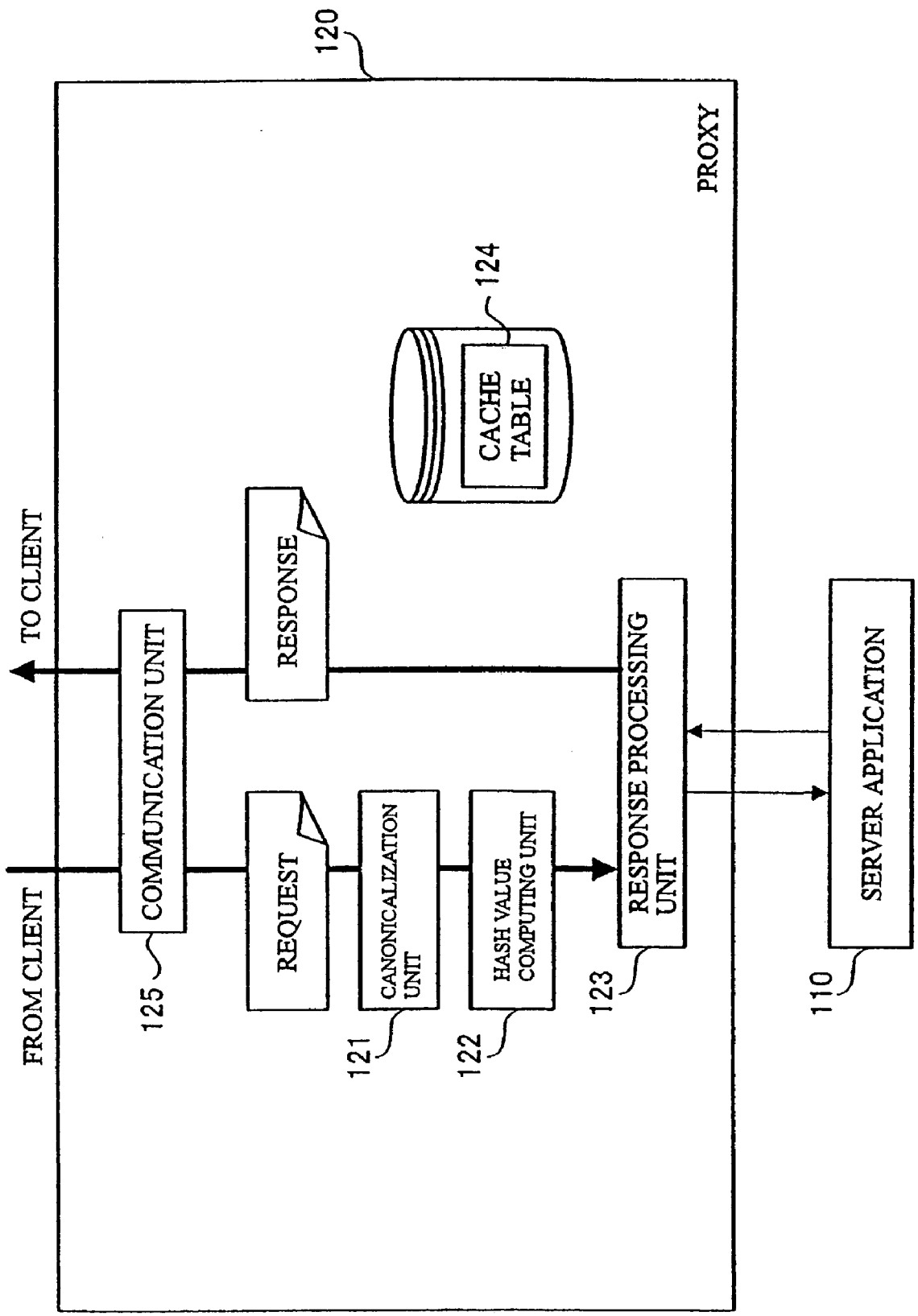
FIG. 4 shows a configuration of a server for implementing a cache system according to the embodiment.

FIG. 4 shows a configuration of the server 100 for implementing the cache system of the above described embodiment in the web service system shown in FIG. 1.

Referring to FIG. 4, the proxy 120 in the server 100 is located in between the server application 110 and the client 200, and it receives a request from and returns a response to the client 200. The proxy 120 includes a canonicalization unit 121 for canonicalizing a request XML document, a hash value computing unit 122 for computing a hash value of the canonicalized XML document, a response processing unit 123 for responding with a cached response or accessing the server application 110, a cache table 124 for caching a response XML document, and a communication unit 125 for transmit/receive data to/from the client 200.

In the configuration shown in FIG. 4, the canonicalization unit 121, the hash value computing unit 122, and the response processing unit 123 are virtual software blocks implemented in a program-controlled CPU. The program that controls the CPU is stored on and distributed as a magnetic disk, an optical disk, semiconductor memory, or other storage media, or distributed via a network. The cache table 124 is constructed in the memory of the server machine that constitutes the server 100.

FIG. 5 shows an exemplary configuration of the cache table 124. Referring to FIG. 5, the cache table 124 consists of three columns: hash values of requests (XML documents), hash values of responses (XML documents), and the response content (XML documents). As shown, in a system that uses XML documents as inputs and outputs, requests with different descriptions may be made for one URL and different responses are returned, or the same requests (hash value of 9PgwNGgkTDs . . . ) may be made for different URLs and the same responses are returned (hash value of WaX21pBkj1Zd0).

Figure 6:
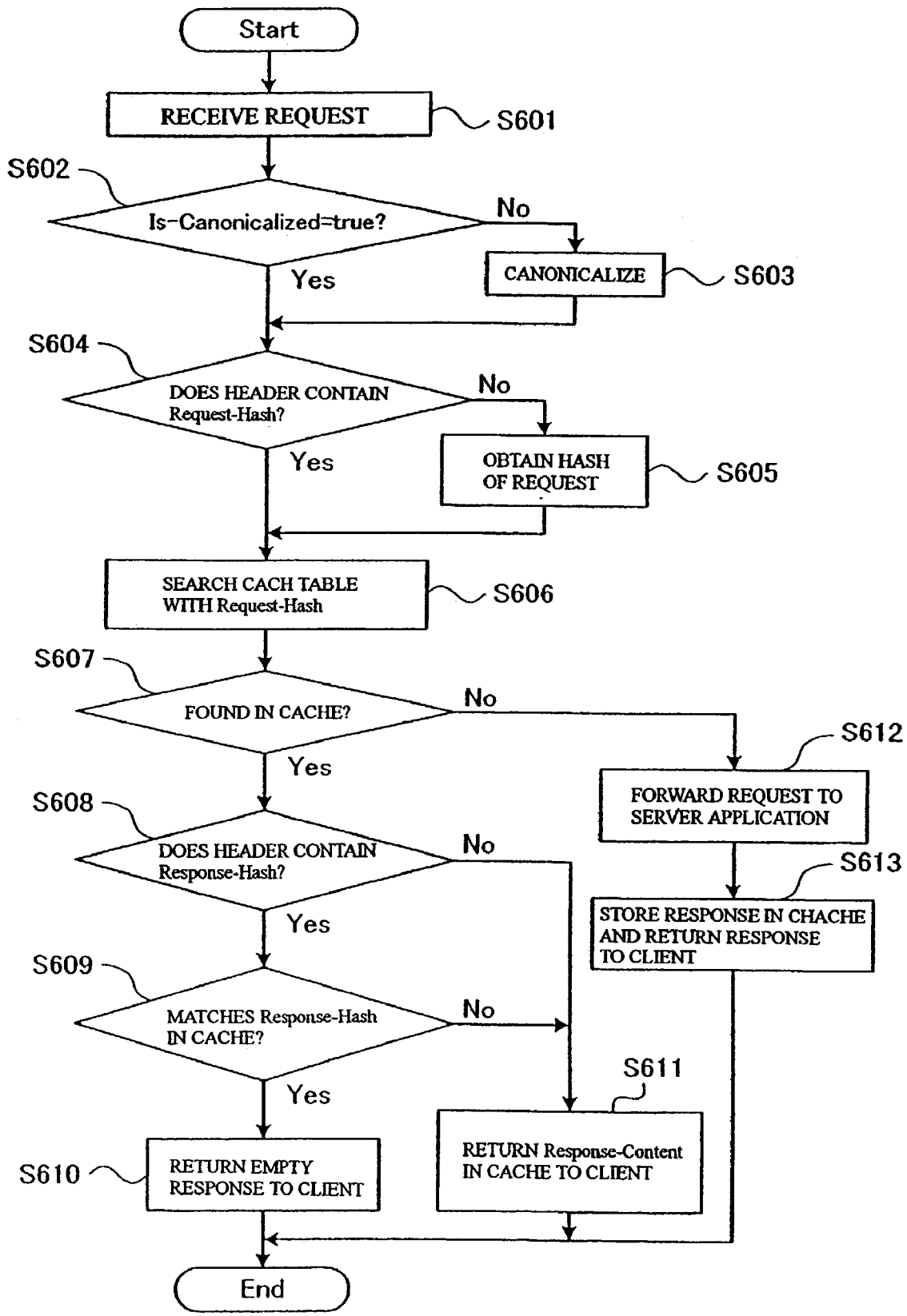
FIG. 6 is a flowchart that describes operation of the proxy in the server according to the embodiment.

FIG. 6 is a flowchart that describes operation of the proxy 120 in the server 100 configured as shown in FIG. 4. As shown in FIG. 6, once the proxy 120 receives a request from the client 200 (step 601), first it checks if the request XML document has been canonicalized. If it has not been canonicalized, the canonicalization unit 121 performs canonicalization (step 602, 603).

Next, it is checked if the header of the request contains a hash value of the request XML document. If the header does not contain the hash value, the hash value computing unit 122 computes the hash value of the XML document (step 604, 605). Then, the hash value obtained from the header or generated in step 605 is used as a key to search the cache table 124 (step 606). If a corresponding cached response XML document is found, then the proxy 120 checks if the header of the request contains a hash value of a response XML document (step 607, 608). If the header contains the hash value, it is determined if the hash value matches the hash value of the corresponding response XML document stored in the cache table 124 (step 609). If the hash values match, an empty response is returned to the requesting client 200 (step 610).

If the header of the request does not contain a hash value of a response XML document, or if the header contains a hash value that does not match the hash value stored in the cache table 124, the corresponding response content (XML document) stored in the cache table 124 is returned to the requesting client 200 (step 608, 609, 611).

On the other hand, if a corresponding response XML document is not found in searching the cache table 124 in step 606, the proxy 120 accesses the server application 110 and forwards the request to wait for a response (step 607, 612). Then, depending on the provided service, the server application 110 performs processing such as database search and generates a response XML document, which is returned to the proxy 120. The proxy 120 receives the response from the server application 110 and returns it to the requesting client 200, while storing the response in the cache table 124 (step 613).

Figure 7:
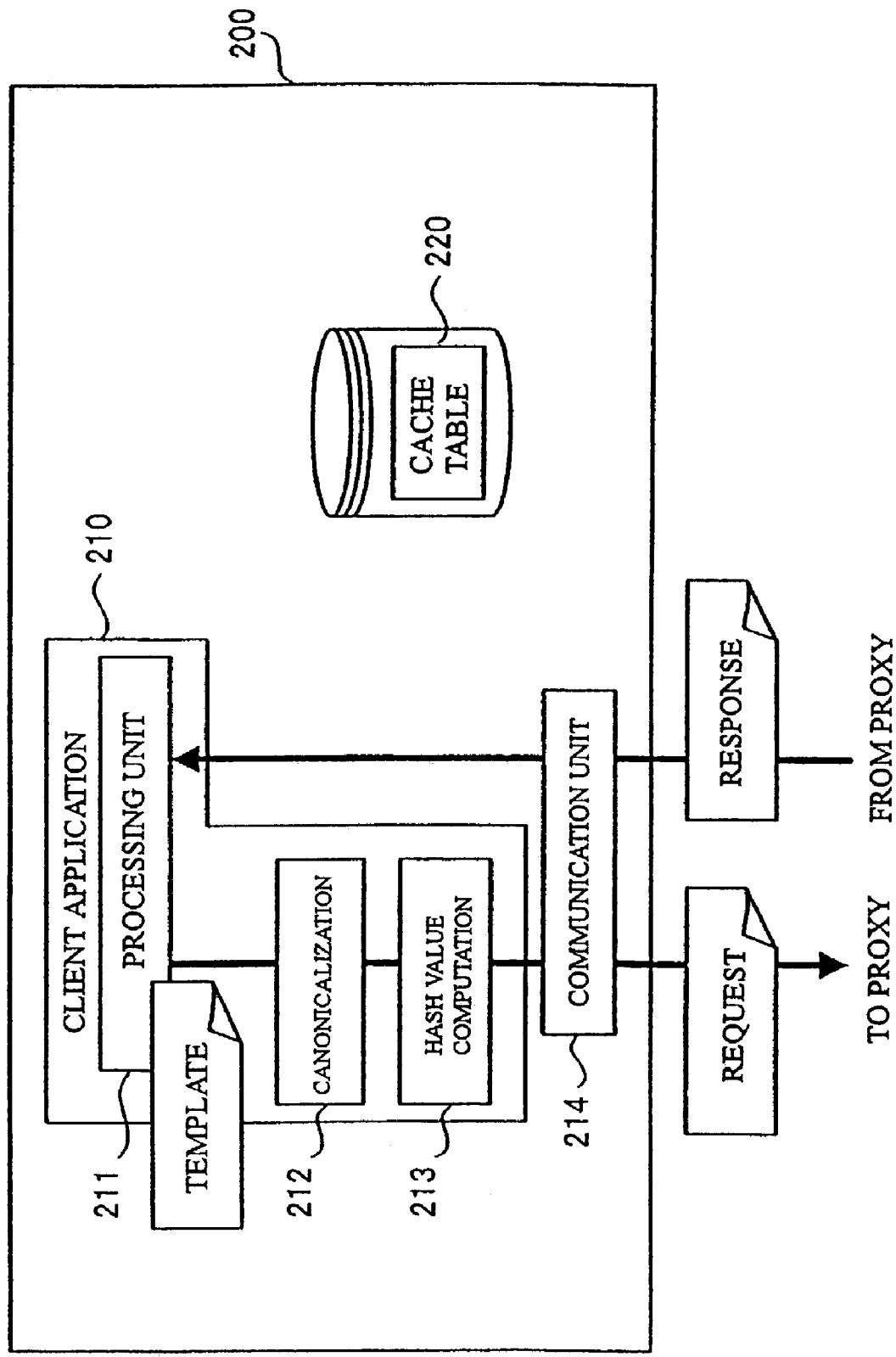
FIG. 7 shows a configuration of the client for implementing the cache system according to the embodiment.

FIG. 7 shows a configuration of the client 200 for implementing the cache system of this embodiment. Referring to FIG. 7, the client application 210 in the client 200 includes a processing unit 211 for preparing a request XML document to be transmitted and processing a received response XML document, a canonicalization information adding unit 212 for adding information indicating that an XML document has been canonicalized to the header of a request to be transmitted, a hash value computing unit 213 for computing a hash value of a canonicalized XML-document, and a communication unit 214 for transmitting/receiving data to/from the server 100. The client 200 may also include a cache table 220 that has the same configuration as the cache table 124 in the proxy 120 of the server 100.

In the configuration shown in FIG. 7, the processing unit 211 the canonicalization information adding unit 212 and the hash value computing unit 213 are virtual software blocks implemented in a program-controlled CPU. The program that controls the CPU is stored on and distributed as a magnetic disk, an optical disk, semiconductor memory, or other storage media, or distributed via a network. The cache table 220 is constructed on a local disk of the client machine that constitutes the client 200.

Figure 8:
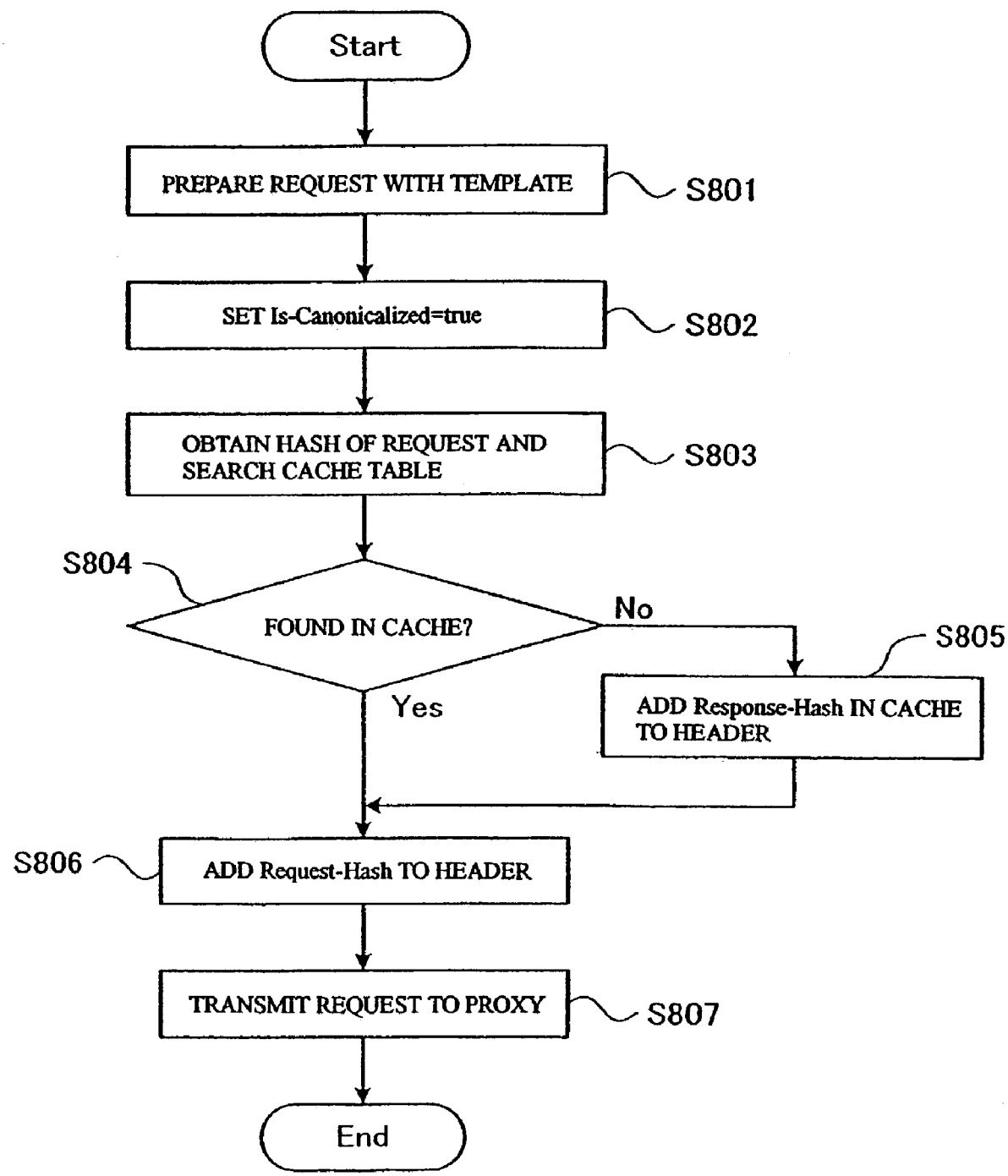
FIG. 8 is a flowchart that describes operation of a client application of the client according to the embodiment, in particular, operation in transmitting a request.
Figure 9:
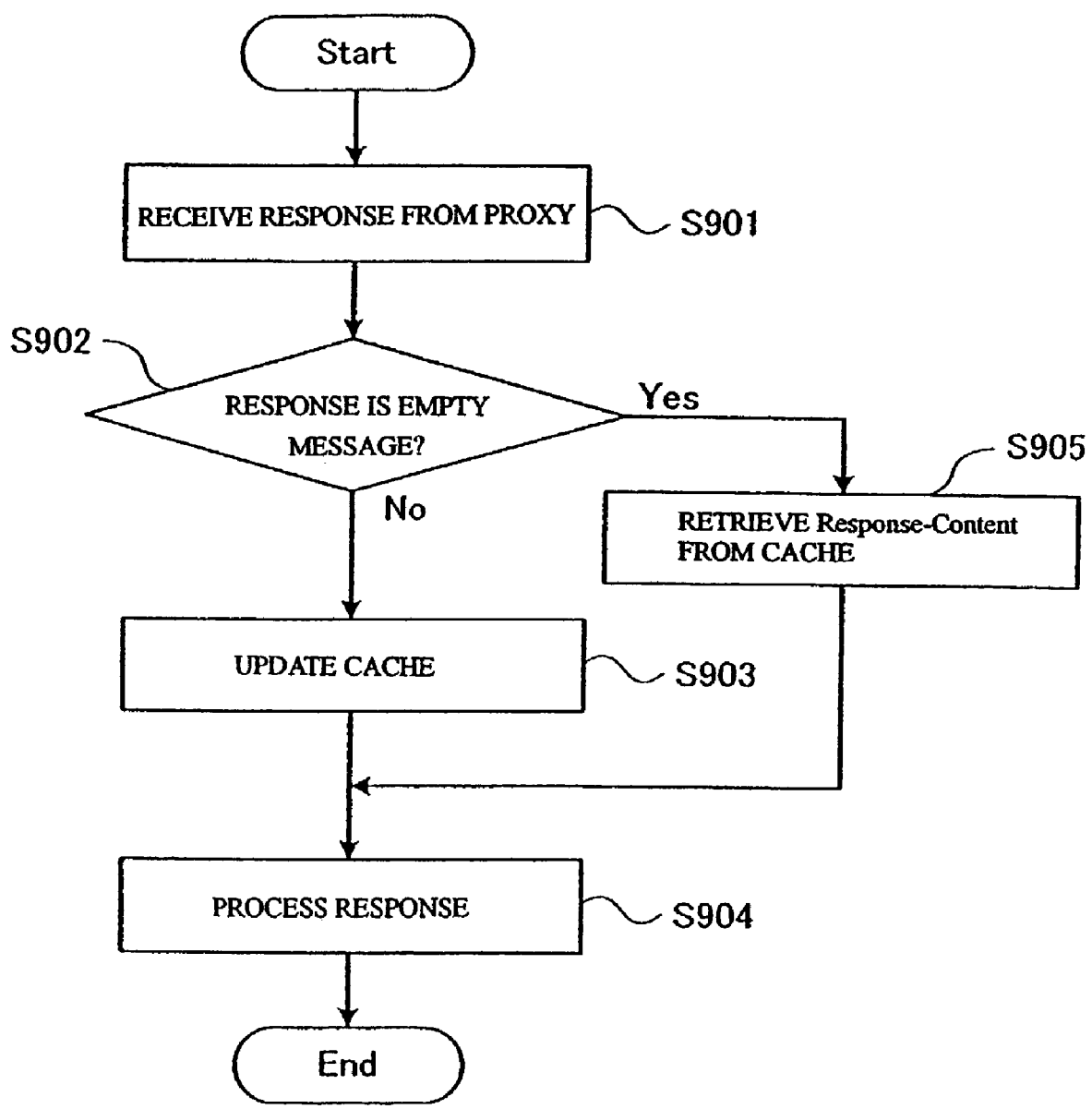
FIG. 9 is a flowchart that describes operation of a client application of the client according to the embodiment, in particular, operation in receiving a response.

FIGS. 8 and 9 are flowcharts that describe operation of the client application 210 of the client 200 configured as shown in FIG. 7. Here, operation in the case where the client 200 includes the cache table 220 is described. Referring to FIG. 8, which describes operation in transmitting a request, the processing unit 211 of the client application 210 first prepares a request (an XML document and a header) with a template (step 801). The template has been generated in the server 100 and provided to the client 200.

Then, the canonicalization information adding unit 212 of the client application 210 adds information indicating that the XML document has been canonicalized (Is-Canonicalized: true) to the header of the request (step 802). Then, the hash value computing unit 213 computes a hash value of the request XML document, and the obtained hash value is used to as a key to search the cache table 220 (step 803). If a cached response XML document corresponding to the request is found, the hash value of the corresponding response XML document is added to the request header (step 804, 805). The hash value of the request XML document computed in step

803 is also added to the request header (step 806), and the request is transmitted to the server 100 (step 807).

If a corresponding response XML document is not found in the cache table 220 in searching in step 803, the hash value of the request XML document computed in step 803 is added to the request header (step 804, 806), and the request is transmitted to the server 100 (step 807).

Now, referring to FIG. 9, which describes operation in receiving a response from the server 100, first the processing unit 211 of the client application 210 checks if the received response is an empty message (step 901, 902). If the response is not an empty message, the processing unit 211 updates the corresponding entry in the cache table 220 (step 903), and performs processing for the response XML document (step 904). On the other hand, if the response is an empty message, a cached response content (XML document) can be used: the cached response content is read out for processing (step 905, 904).

FIG. 10 shows an exemplary request transmitted from the client 200 in the web service system of this embodiment.

As shown, the header of the request describes a hash value of the request XML document (Request-Hash), a hash value of the response XML document for the request (Response-Hash), and information indicating that the request XML document has been canonicalized (Is-canonicalized).

FIG. 11 shows an exemplary response to the request of FIG. 10. The response is shown as an example where the hash value of the response XML document described in the header of the request matches a hash value stored in the cache table 124 in the server 100. Therefore, the body of the response is empty.

Now, based on various aspects of the XML document transmitted and received according to this embodiment, procedures performed by the proxy 120 of the server 100 and the client application 210 of the client 200 are described.

<Operation of the Proxy 120>

Aspect 1: when the proxy 120 receives a request with the header containing a blank Request-Hash, a blank Response-Hash, and Is-Canonicalized=false (when the client 200 does not take caching into consideration).

The proxy 120 canonicalizes the received request XML document, computes the hash value of it, and searches through the request hash values in the cache table 124.

If matching cached data is found, a header is generated that contains the request hash value and the response hash value in that entry, and the response content in that entry is returned with the header to the requesting client 200.

On the other hand, if no matching cached data is found, the request is forwarded to the server application 110, and a response is received. Then, the response is returned to the requesting client 200 while information on the response is stored as new information in the cache table 124.

Aspect 2: when the proxy 120 receives a request with the header containing a blank Request-Hash, a blank Response-Hash, and Is-Canonicalized=true (when the client 200 prepares the XML document with a template and transmits the request).

The proxy 120 computes the hash value of the received request XML document and searches through the request hash values in the cache table 124.

Then, as in the case of the aspect 1, if matching cached data is found, a header is generated that contains the request hash value and the response hash value in that entry, and the response content in that entry is returned with the header to the requesting client 200.

If no matching cached data is found, the request is forwarded to the server application 110, and a response is received. Then, the response is returned to the requesting client 200 while information on the response is stored as new information in the cache table 124.

Aspect 3: when the proxy 120 receives a request with the header containing a value of Request-Hash, a blank Response-Hash, and Is-Canonicalized=true (when the client 200 prepares the XML document with a template and transmits the request with a hash value of Request-Hash added to the header).

The proxy 120 searches the cache table 124, wherein the hash value of the request XML document added to the header of the received request is used as a key.

Then, as in the case of the aspect 1, if matching cached data is found, a header is generated that contains the request hash value and the response hash value in that entry, and the response content in that entry is returned with the header to the requesting client 200.

If no matching cached data is found, the request is forwarded to the server application 110, and a response is received. Then, the response is returned to the requesting client 200 while information on the response is stored as new information in the cache table 124.

Aspect 4: when the proxy 120 receives a request with the header containing a value of Request-Hash, a value of Response-Hash, and Is-Canonicalized=true (when the client 200 transmits the same request as the one that has been transmitted before).

The proxy 120 searches the cache table 124, wherein the hash value of the request XML document added to the header of the received request is used as a key. Then, if matching cached data is found, the hash value of the response XML document added to the header of the request is compared with the hash value stored in that entry in the cache table 124. If the hash values match, a status code 204 (No Content) is returned without the response content to the requesting client 200. On the other hand, if the hash values do not match, the hash values of the request XML document and the response XML document stored in that entry are added to the header of the response, and the response is returned with the response content to the requesting client 200.

If no matching cached data is found in searching the cache table 124 using the hash value of the request XML document as a key, the request is forwarded to the server application 110, and a response is received. Then, the response is returned to the requesting client 200 while information on the response is stored as new information in the cache table 124.

<Operation of the Client Application 210>

Aspect 5: when the client application 210 does not take caching into account.

The client application 210 transmits a request that is acceptable for the server application 110 (the XML document is not generated with a template and is not canonicalized). The header of the response contains information such as Request-Hash and Response-Hash, but the client ignores them. This operation corresponds to the operation of the aspect 1 in the proxy 120.

Aspect 6: when the client application 210 prepares a request with a template, and the client 200 does not include the cache table 220.

The client application 210 prepares the request with the template and transmits the request to the server 100 with the value of Is-Canonicalized being set to true in the request header. The header of the response contains information such as Request-Hash and Response-Hash, but the client ignores them. This operation corresponds to the operation of the aspect 2 in the proxy 120.

Aspect 7: when the client application 210 prepares a request with a template, and the client 200 includes the cache table 220.

The client application 210 prepares the request with the template and sets the value of Is-Canonicalized to true in the request header. Then, it computes the hash value of the request XML document and uses the hash value as a key to search the cache table 220.

If matching cached data is found, the obtained hash value of the request XML document and the hash value of the response XML document for the request are added to the header of the prepared request, which is then transmitted to the server 100. If an empty message (204 No Content) is returned as a response from the server 100, the response content obtained from the cache table 220 is used as the response to this request.

If the response is not an empty message (200 OK), the received response content is used for processing. Further, since the response header contains information on the Request-Hash and the Response-Hash, the cache table 220 is updated with this information and the received response content.

This operation corresponds to the operation of the aspect 4 in the proxy 120.

On the other hand, if no matching cached data is found in searching the cache table 220, the request is transmitted to the server 100 with only the hash value of the request XML document (Request-Hash) added to the header. The response content of the response from the server 100 is used for processing, and since the response header contains information on the Request-Hash and the Response-Hash, this information and the received response content are stored in the cache table 220.

This operation corresponds to the operation of the aspect 3 in the proxy 120.

Thus, in the foregoing description, the hash values of the request XML document and the response XML document are used as keys for the cache. As described, by using the hash values that are the compressed forms of the XML documents, rather than using the XML documents directly, the size of the cache stored in the memory of the server 100 or the client 200 can be reduced. Further, as indicated in the aspects 4 and 7, transmitting an empty message (only the hash value) from the server 100 to the client 200 contributes to reduction of the network traffic.

Figure 12:
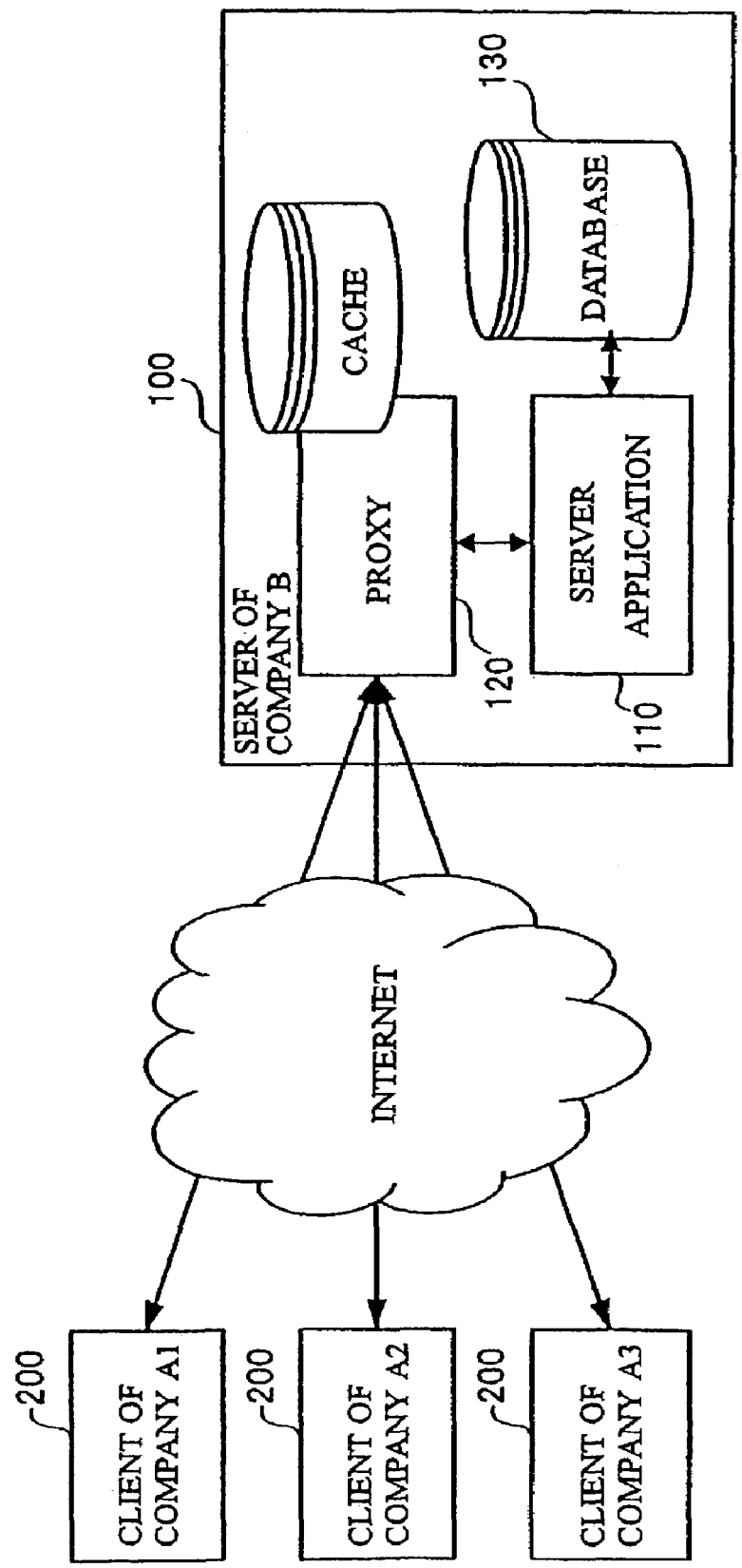
FIG. 12 shows an overall configuration of a service system for providing product information to which the embodiment is applied.

Now, a detailed example of a web service system that uses this embodiment is described. FIG. 12 shows an overall configuration of a service system for providing product information, to which this embodiment is applied. Referring to FIG. 12, the system includes the server 100 constructed in a product supplier company B and clients 200 owned respectively by companies A1, A2, and A3, which are business partners of the company B. The server 100 and each client 200 are connected via the Internet.

The server 100 of the company B includes the server application 110 and the proxy 120, as well as a database 130 used by the server application 110. The server application 110 in this system refers to the database 130 at the request of the clients 200 and obtains necessary product information to return a response. The clients 200 of the companies A1, A2, and A3 each include the client application 210.

In the system shown in FIG. 12, the company B allows information on its products (specifications, prices, inventory, etc.) to be available to its business partners (companies A1, A2, and A3) as a web service. The companies A1, A2, and A3 can obtain the information on the products by accessing the web service of the company B.

Here, the web service of the company B may be subjected to a heavy load due to receiving requests from many companies. Thus, to reduce the amount of processing of the server application 110 including assembling responses and accessing the database 130, the proxy 120 processes responses using the cache. It is noted that if the company B discloses the specification of the web service (WSDL (Web Services Description Language)), the web service can be accessed with a general-purpose client application 210.

If a particular company (for example, the company A3) accesses the company B quite frequently, the company B may provide a template for its cache system to the company A3 so that the company A3 uses the template to prepare requests. This allows the more efficient use of the cache system. In this case, the company A3 preferably uses the client application 210 especially intended for the cache system of the company B.

As described above, this invention can provide an efficient cache system in a network system that allows for different expressions of requests with the same meaning. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. In some cases an apparatus is implemented as a computer program.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above.

The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A data processing method in a computer for responding to processing requests with cached data, comprising the steps of:
    preparing a first processing request, wherein preparing the first processing request comprises:
        canonicalizing a first data file with the use of a template that complies with predetermined canonicalization rules to create a first canonicalized data file;
        including the first canonicalized data file with the first processing request;
        including canonicalization indication information indicating that the first data file has been canonicalized in the header of the first processing request;
    transmitting the first processing request to a server;
    caching data for responding to the first processing request in a cache table stored in memory by using the first canonicalized data file included in the first processing request as a key based on the header of the first processing request including canonicalization indication information indicating that the first data file has been canonicalized;
    preparing a second processing request, wherein preparing the second processing request comprises:
        canonicalizing a second data file with the use of the template that complies with the predetermined canonicalization rules;
        including the second canonicalized data file with the second processing request;
        including canonicalization indication information indicating that the second data file has been canonicalized in the header of the second processing request;
    transmitting the second processing request to the server;
    responding to a second processing request made after caching the data for responding to the first processing request,
        wherein the second processing request includes a second canonicalized data file,
        wherein responding to the second processing request comprises:
            searching for the data cached in the cache table by using the canonicalized data file included in the second processing request as a key,
            wherein the first canonicalized data file matches the second canonicalized data file; and
            responding to the second processing request with the cached data.

2. The data processing method according to claim 1, wherein the step of caching data comprises the steps of:
    caching the data for responding by using the canonicalized data file as a key, and wherein the step of responding to the second processing request comprises the steps of:
    cononicalizing the data file included in the second processing request; and
    searching for the cached data by using the canonicalized data file as a key.

3. The data processing method according to claim 1 further comprising the step of preparing the processing requests so that they include XML documents complying with a predetermined canonicalization rule as the data files.

4. The data processing method according to claim 1, wherein the step of caching data comprises the steps of:
    checking if a hash value of the data file included in the first processing request has been added to the first processing request and computing the hash value if the hash value has not been added; and
    caching the data used for responding by using the hash value of the data file obtained from the first processing request or obtained by computation as a key, and wherein the step of responding to the second processing request comprises the steps of:
    checking if a hash value of the data file included in the second processing request has been added to the second processing request and computing the hash value if the hash value has not been added; and
    searching for the cached data by using the hash value of the data file obtained from the second processing request or obtained by computation as a key.

5. An article of manufacture comprising a computer readable storage medium having computer readable program code means embodied therein for causing data processing, the computer readable program code means in said article of manufacture comprising computer readable program code means for causing a computer to effect the steps of claim 1.

6. A network service system comprising:
    a first computer readable storage medium including a server, and
    a second computer readable storage medium including a client connected to the server via a network,
        wherein the client transmits a processing request to the server, the processing request including a XML document,
        wherein the client is configured to prepare the processing request,
            wherein preparing the processing request comprises:
            canonicalizing the XML document included in the processing request with the use a template that complies with predetermined canonicalization rules to create a canonicalized XML document,
            including the canonicalized XML document with the first processing request, and
            including canonicalization indication information in a header of the processing request, the canonicalization indication information indicating that the processing request has been canonicalized,
        wherein the server returns a response to the processing request while the server processes the canonicalized XML document included in the processing request and caches the content of the response by using the canonicalized XML document as a key.

7. The network service system according to claim 6, wherein in processing the XML document, the server canonicalizes the XML document according to a predetermined canonicalization rule.

8. The network service system according to claim 6, wherein in processing the XML document, the server computes a hash value of the XML document and uses the hash value as a key to cache the content of the response.

9. The network service system according to claim 6, wherein the client caches the response to the processing request returned from the server in memory by using an XML document included in the processing request as a key, and when making a processing request with the same content as the previous processing request, the client searches the memory by using the XML document of the processing request as a key, and uses the cached response for processing.

10. An article of manufacture comprising a computer readable storage medium having computer readable program code means embodied therein for causing data processing, the computer readable program code means in said article of manufacture comprising computer readable program code means for causing a computer to effect the steps of claim 6.

11. A server that provides services via a network, the server including a computer readable medium comprising:
   an application for generating a response to a request received from a client,
   wherein the request received from the client includes:
      a header including canonicalization indication information indication that a data file included in the request has been canonicalized, and
      the data file,
         wherein the data file is canonicalized with the use of a template that complies with predetermined canonicalization rules;
   a cache table for storing the response to the request by using the data file included in the request as a key based on the canonicalization indication information included in the header of the request indicating that the data file has been canonicalized; and
   a response processing unit for searching the cache table by using the data file as a key, wherein if a cached response corresponding to the request is found, the
      response processing unit returns the cached response to the client, and wherein if a cached response corresponding to the request is not found, the
   response processing unit passes processing to the application and stores a response generated by the application in the cache table.

12. The server according to claim 11 further comprising a canonicalization unit for canonicalizing the data file included in the request according to a predetermined canonicalization rule, wherein the cache table stores the response by using the data file canonicalized by the canonicalization unit as a key, and the response processing unit searches the cache table by using the data file canonicalized by the canonicalization unit as a key.

13. The sewer according to claim 11 further comprising a hash value computing unit for computing a hash value of the data file included in the request, wherein the cache table stores the response by using the hash value of the data file computed by the hash value computing unit as a key, and the response processing unit searches the cache table by using the hash value of the data file computed by the hash value computing unit as a key.

14. The sewer according to claim 11, wherein the data file included in the request is an XML document canonicalized according to a predetermined canonicalization rule.

15. A client that receives services provided from server via a network, the client including a computer readable medium comprising:
   a processing unit for preparing a processing request to be transmitted to the server, wherein preparing the processing request comprises:
      canonicalizing a XML document with the use of a template that complies with predetermined canonicalization rules to create a canonicalized XML document;
      including the canonicalized XML document with the processing request;
      including canonicalization indication information indicating that the XML document has been canonicalized in the header of the processing request;
   a hash value computing unit for computing a hash value of the XML document included in the request prepared by the processing unit and adding the hash value to a header of the request; and
   a transmission unit for transmitting the request to the server with the hash value of the XML document added to the header.

16. A client that receives services provided from a server via a network, the client including a computer readable medium comprising:
   a processing unit for preparing a processing request to be transmitted to the server, wherein preparing the processing request comprises:
      canonicalizing a XML document with the use of a template that complies with predetermined canonicalization rules to create a canonicalized XML document;
      including the canonicalized XML document with the processing request;
   a canonicalization information adding unit for adding the canonicalization information indicating that the XML document has been canonicalized to a header of the request associated with the XML document;
   a communication unit for transmitting the request prepared by the processing unit to the server and receiving the response from the server; and
   a cache table for storing the response from the server by using the XML document included in the request as a key,
      wherein the processing unit uses the XML document as a key to search the cache table, and
      wherein if a cached response corresponding to the request is found, the processing unit uses the cached response for processing,
      wherein if a cached response to the request is not found, the communication unit transmits the request prepared by the processing unit to the server and receives the response from the server.

17. The client according to claim 16 further comprising a hash value computing unit for computing a hash value of the XML document included in the request, wherein the cache table stores the response by using the hash value computed by the hash value computing unit as a key, and the response processing unit searches the cache table by using the hash value computed by the hash value computing unit as a key.

18. A computer program product that includes a computer readable storage medium useable by a processor, the medium having stored thereon a sequence of instructions which, when executed by the processor, causes the processor to perform a method to respond to a processing request with cached data, wherein the method includes the steps of:
   generating a response to a request received from a client,
      wherein the request received from the client includes:

a header including canonicalization indication information indication that a data file included in the request has been canonicalized, and the data file, wherein the data file is canonicalized with the use of a template that complies with predetermined canonicalization rules;

storing the response to the request in a cache table by using the data file included in the request as a key based on the canonicalization indication information indicating that the data file has been canonicalized searching the cache table by using the data file as a key, if a cached response corresponding to the request is found by the searching, responding to the request by sending the cached response to the client; and if a cached response corresponding to the request is not found:

processing the request by an application to generate a response, storing the generated response in the cache table using the data file as a key;

sending the generated response to the client.

19. A computer program product that includes a computer readable storage medium useable by a processor, the medium having stored thereon a sequence of instructions which, when executed by the processor, causes the processor perform a method to respond to a processing request with cached data, wherein the method includes the steps of:

preparing a processing request to be transmitted to the server, wherein preparing the processing request comprises:

canonicalizing a XML document with the use of a template that complies with predetermined canonicalization rules to create a canonicalized XML document;

including the canonicalized XML document with the processing request;

including canonicalization indication information indicating that the XML document has been canonicalized in the header of the processing request;

computing a hash value of the XML document included in the prepared request and adding the hash value to a header of the request; and transmitting the request to a server with the hash value of the XML document and the canonicalization indication information that serves as an indicator that the XML document has been canonicalized being added to the header.

* * * * *

UNITED STATES PATENT AND TRADEMARK OFFICE
CERTIFICATE OF CORRECTION

PATENT NO. : 7,660,844 B2  Page 1 of 1
APPLICATION NO. : 10/382610
DATED : February 9, 2010
INVENTOR(S) : Takase et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Thirtieth Day of November, 2010

David J. Kappos
*Director of the United States Patent and Trademark Office*